United States Patent [19]

Kakida et al.

[11] Patent Number: 5,299,506

[45] Date of Patent: Apr. 5, 1994

[54] GUIDE APPARATUS FOR TRANSPORTATION SYSTEM HAVING DIFFERING IN HEIGHT RAIL JOINTS TO REDUCE NOISE AND VIBRATION DURING VERTICAL TRAVEL

[75] Inventors: Takuya Kakida, Kurashiki; Noriyuki Inoue, Asakuchi; Shoichi Okada, Kurashiki; Akira Mikami, Kurashiki; Akiyoshi Kimura, Kurashiki; Yuji Watanabe, Kojima, all of Japan

[73] Assignee: Mitsuishi Jidosha Kogyo Kabushiki Kaisha, Tokyo, Japan

[21] Appl. No.: 953,464

[22] Filed: Sep. 29, 1992

[30] Foreign Application Priority Data

Oct. 4, 1991 [JP] Japan .................. 3-80923[U]

[51] Int. Cl.⁵ ............................................ B61B 3/00
[52] U.S. Cl. ........................................ 104/98; 104/96; 212/213
[58] Field of Search .................. 104/94, 96, 98, 127, 104/128, 129, 130; 212/205, 213, 221

[56] References Cited

U.S. PATENT DOCUMENTS

| | | | |
|---|---|---|---|
| 2,692,168 | 10/1954 | Gregory | 104/98 X |
| 3,783,792 | 1/1974 | Cullom | 104/98 X |
| 4,395,180 | 7/1983 | Magnotte | 104/98 X |
| 4,846,073 | 7/1989 | Boyer et al. | 104/130 X |
| 4,991,707 | 2/1991 | Alexander et al. | 104/103 X |

FOREIGN PATENT DOCUMENTS

| | | |
|---|---|---|
| 1806681 | 7/1970 | Fed. Rep. of Germany . |
| 3423916 | 1/1986 | Fed. Rep. of Germany ...... 104/96 |
| 2911051 | 7/1988 | Fed. Rep. of Germany . |
| 3824505 | 1/1990 | Fed. Rep. of Germany . |

*Primary Examiner*—Matthew C. Graham
*Assistant Examiner*—S. Joseph Morano
*Attorney, Agent, or Firm*—Abelman Frayne & Schwab

[57] ABSTRACT

A pair of vertical guide rails of a workpiece transporting system are comprised of upper and lower rail portions, the upper rail portions being movable into axial alignment with the lower rail portions, the upper and lower rail portions being supported from a ceiling member of a building, and thus movable in unison with each other in the event of movement of the ceiling member of the building. A joint between the upper and lower rail portions of one guide rail is arranged at a vertical height different from that of the joint between the upper and lower rail portions of the other guide rail.

6 Claims, 5 Drawing Sheets

GUIDE APPARATUS FOR TRANSPORTATION SYSTEM HAVING DIFFERING IN HEIGHT RAIL JOINTS TO REDUCE NOISE AND VIBRATION DURING VERTICAL TRAVEL

FIELD OF THE INVENTION

This invention relates to a guide apparatus for a transportation system to be installed in a building such as a factory.

DESCRIPTION OF THE PRIOR ART

In an automobile assembly factory, for example, a transportation system is used to transport workpieces such as body panels. There has been provided a transportation system in which the workpiece is fed horizontally, one in which the workpiece is fed vertically, and, one in which the workpiece is fed both horizontally and vertically.

As shown in FIG. 6, a known transportation system, which has the function to feed a workpiece both in horizontal and vertical directions, has a horizontal guide rail 2 fixed to a member 1 at the ceiling of a building, and a traversal unit 3 (only partly shown) which moves in a horizontal direction, i.e., in the direction of arrow A in FIG. 6, along the guide rail 2. The traversal unit 3 is provided with a body 4 which can move in the vertical direction, i.e., in the direction of arrow B in FIG. 6, along an upper rail 5 portion which guides the vertical movement of the body 4. The upper rail 5 portion extends beneath the traversal unit 3.

A lower rail portion 7, extending above a floor 6 of the building, is provided beneath the upper rail portion 5 and the lower rail portion 7 are in line with each other when the traversal unit 3 stops at a predetermined position in the building. When the upper rail portion 5 and the lower rail portion 7 are in line with each other, the body 4 is moved in the direction of the arrow B by means of a vertical drive mechanism (not shown) such as a winch. The upper rail portion 5 and the lower rail portion 7 have groove extending in the longitudinal direction. Guide rollers 8 of the body 4 are rolled on the inside surfaces of the grooves 5 to guide vertical movement of the body 4.

In the above prior art system, the upper rail portion 5 is provided on the traversal unit 3, and the traversal unit 3 is supported on the guide rail 2, which is secured to the building. Therefore, the position of the upper rail portion 5 is affected by the structural condition of the building. On the other hand, the lower rail portion 7 is fixed to the floor 6 of the building.

As a result, when a positional deviation occurs in portions of the building relative to the floor 6 due to effects of thermal expansion and the like caused by seasonal factors, the stop position of the traversal unit 3 tends to vary, resulting in a deviation in the relative positions of the upper rail portion 5 and the lower rail portion 7. If the deviation is substantial, the guide rollers 8 become unable to change over between the rail portion 5 and 7 at the joint 9 between the rail portions 5 and 7.

Heretofore, trumpet-shaped widened portions 5a and 7a, which individually extended over lengths $L_1$ and $L_2$, are provided at the joint 9 between the rail portions 5 and 7, so that the guide rollers 8 can transfer between the upper rail portion 5 and the lower rail portion 7 even if a deviation occurs to some extent in the horizontal direction between the upper rail portion 5 and the lower rail portion 7.

However, when the above widened portions 5a and 7a are provided, movement of the guide rollers 8 becomes noisy during the time the guide rollers 8 pass through the widened portions 5a and 7a, thus resulting in vibration and noise in the body 4 and leading to malfunction of the system.

Therefore, it is a primary object of the present invention to provide a guide for such a transportation system that enables smooth guidance of the vertically moving body provided on a traversal unit, in the substantial absence of noise and vibration.

SUMMARY OF THE INVENTION

In accordance with the present invention, there is provided a guide for a transportation system, comprising a traversal guide rail supported on a member of the building and extending laterally, a traversal unit mounted for movement along the traversal guide rail, and vertical guide rail portions for guiding vertical movement of a body supported on the traversal unit.

The vertical guide rail portions each comprise an upper rail portion disposed on the traversal unit and extending downwardly beneath the traversal unit, and at least a pair of lower rail portions disposed beneath the upper rail portion. The upper rail portion becomes aligned with one of the lower rail portions when the traversal unit stops at a predetermined position. The lower rail portions are supported from a ceiling member of the building, the height of joints between the upper rail portion and the lower rail portions of the respective guide rails are different from each other. More than one pair of the vertical guide rails preferably is provided.

In the apparatus according to the present invention, the traversal unit is moved in the horizontal direction along the traversal guide rail. A workpiece is held on the vertical movable body of the traversal unit. When the traversal unit is moved and stopped at a predetermined position in the building, lower ends of the upper rail portions and upper ends of the lower rail portions come in alignment with each other. The vertically movable body is then moved downwardly along the vertical guide rails comprising the upper and lower rail portions.

Since the height of the joint between the upper rial portions and the lower rail portions of one of the vertical guide rails are different from that of the other vertical guide rail, when the vertically movable body passes over the joint on one vertical guide rail, that body passes through a portion that does not include the joint on the other vertical guide rail. As a result, the vertically movable body is guided positively by at least one of the vertical guide rails, thereby reducing vibration and noise, and achieving a smooth vertical movement of the vertically movable body.

Furthermore, since both the upper rail portions and the lower rail portions are supported from a ceiling member of the building, the relative position of the upper rail portions relative to lower rail portions is maintained almost constant, even if a deviation occurs in the horizontal position between the building and floor due to seasonal temperature changes or the like, and, the lower end of the upper rail portions and the upper end of the lower rail portions correctly are aligned when the traversal unit stops at a selected predetermined position.

DETAILED DESCRIPTION OF THE PREFERRED EMBODIMENTS

An embodiment of the present invention will now be described with reference to a guide apparatus 11 used in a transportation system 10 shown in FIGS. 1 to 5.

The transportation system 10 is installed in a large-sized building such as an automobile assembly factory, and has the function to transport workpieces, such as panels used in automobile bodies, in both horizontal and vertical directions.

Figure 1:
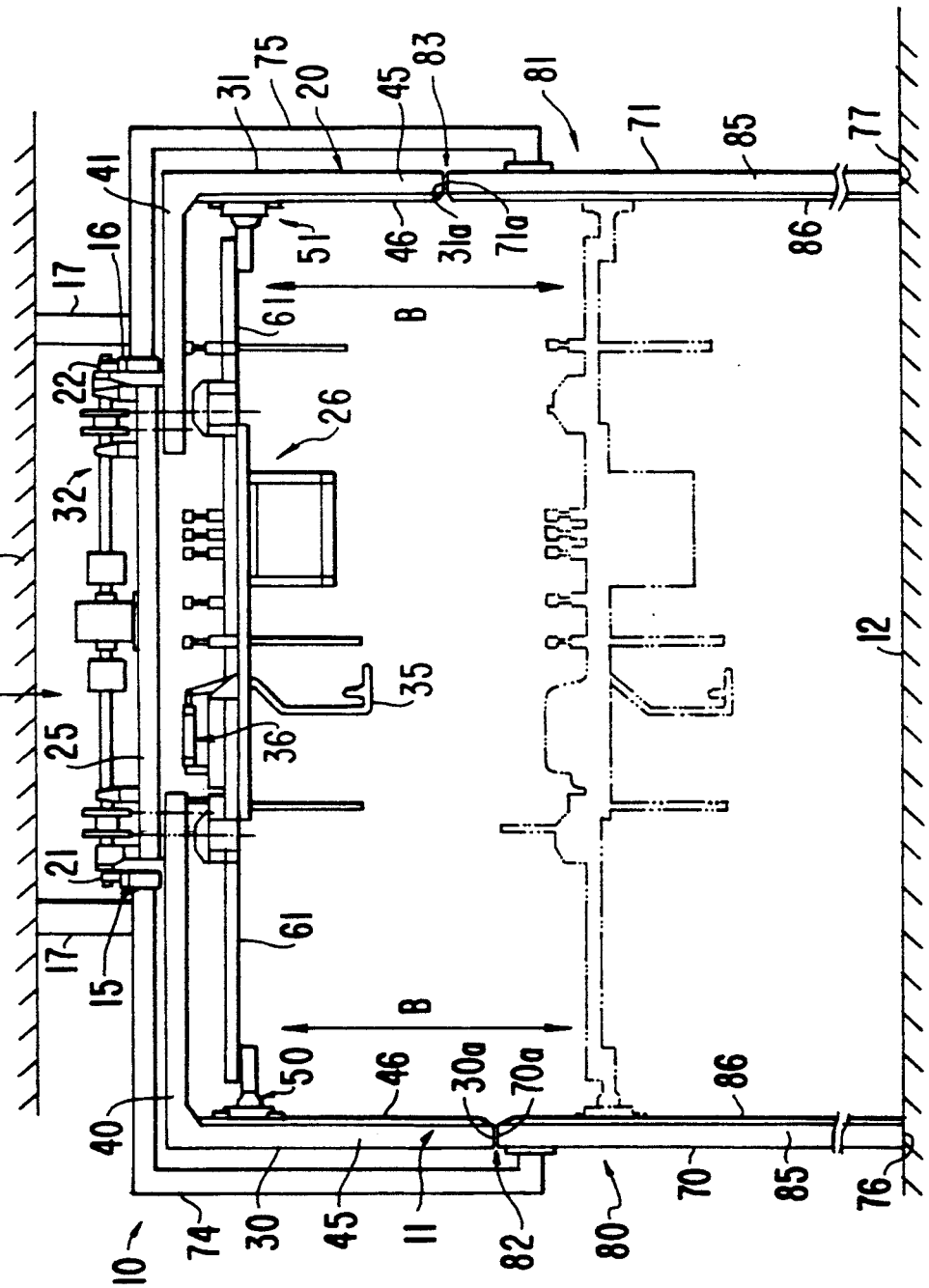
FIG. 1 is a schematic front view of a transportation system equipped with guide apparatus according to the present invention.
Figure 2:
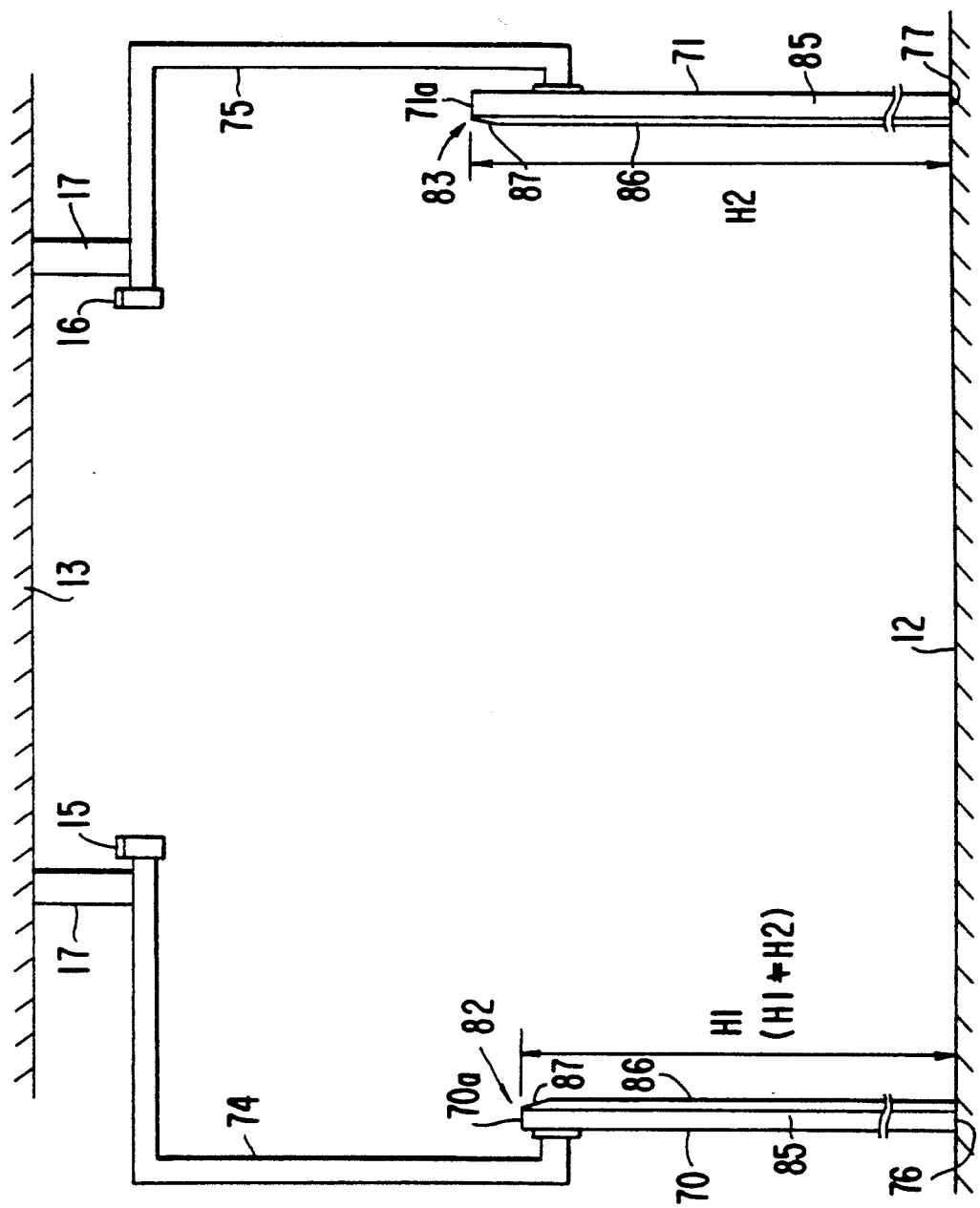
FIG. 2 is a schematic front view of lower rail portions of the system shown in FIG. 1.
Figure 3:
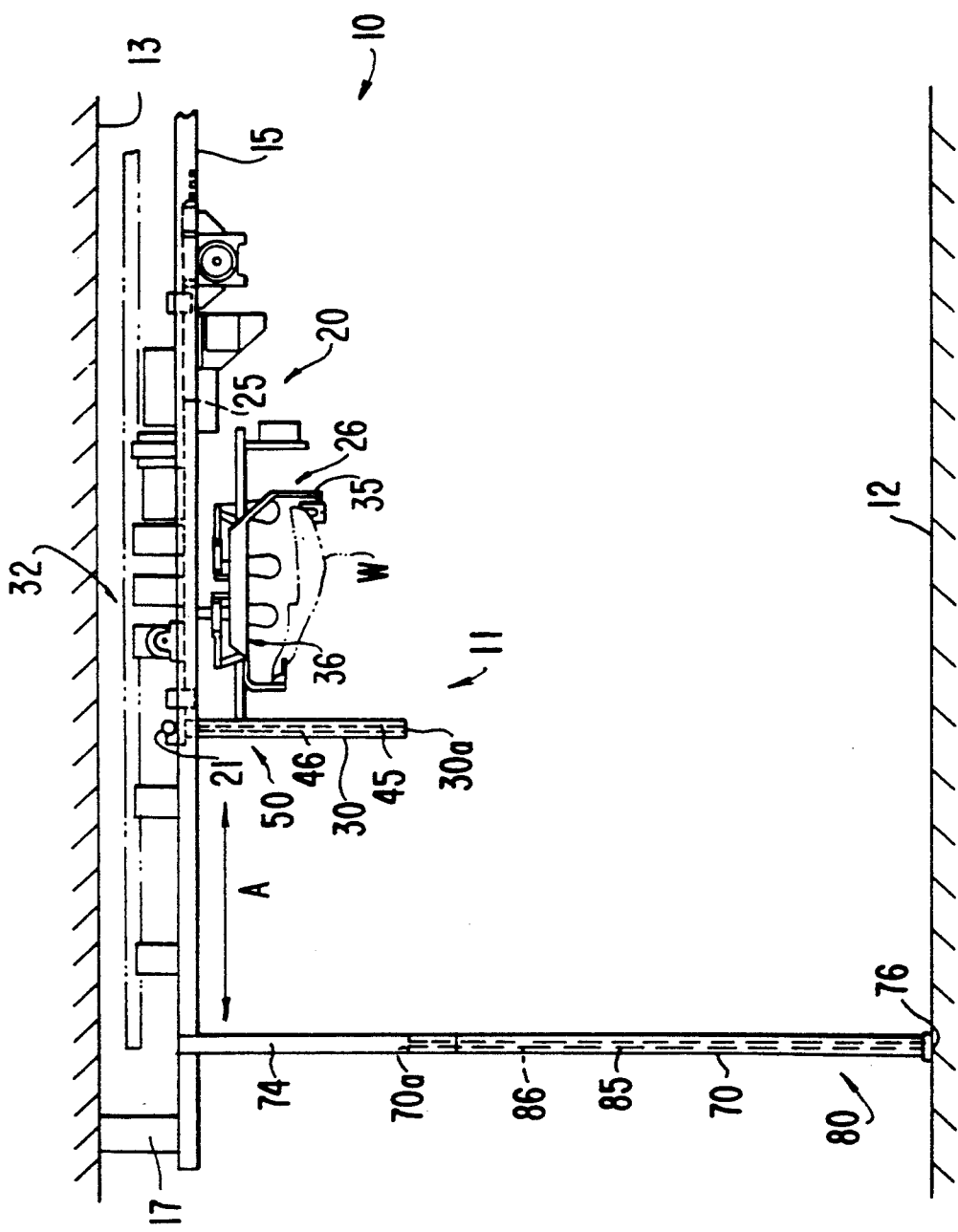
FIG. 3 is a schematic side view showing part of the system shown in FIG. 1.

In FIGS. 1, 2 and 3, a floor 12 of the building is shown at the lower side of the Figures, and a member 13 of the building ceiling is shown at the upper side of those Figures.

Left-side and right-side guide rails 15 and 16 are secured to the ceiling member 13. The guide rails 15 and 16 each extend in a horizontal direction in the building, and are secured at appropriate positions to the ceiling member 13 by means of supporting structures 17.

A traversal unit 20 is movably disposed on the guide rails 15 and 16. Rollers 21 and 22 disposed at an upper portion of a traversal unit 20 are positioned in rolling contact with the guide rails 15 and 16. The traversal unit 20 is adapted to be moved in a horizontal direction (the direction of arrow A in FIG. 3) from a workpiece delivery station to a transfer station by means of a drive mechanism (not shown).

The traversal unit 20 comprises a base frame 25, a body 26 vertically movable on the base frame 25, and a pair of left and right upper rail portions 30 and 31. The body 26 is drive in the vertical direction (the direction of arrow B in FIG. 1) by a drive mechanism 32 such as a wire rope or a chain, and a winch.

The body 26 has a holder 35 to hold a workpiece W (partly shown in FIG. 3) in a predetermined posture. The holder 35 is opened and closed by a drive mechanism 36 using an appropriate actuator such as an air cylinder or the like to hold or release the workpiece W. The workpiece W is, for example, a door panel or side panel of an automobile.

The upper rail portions 30 and 31 are supported at left and right sides of the base frame 25 of the traversal unit 20 by means of horizontal beams 40 and 41. The upper rail portions 30 and 3 extend vertically downwards towards the floor 12 of the building.

Figure 4:
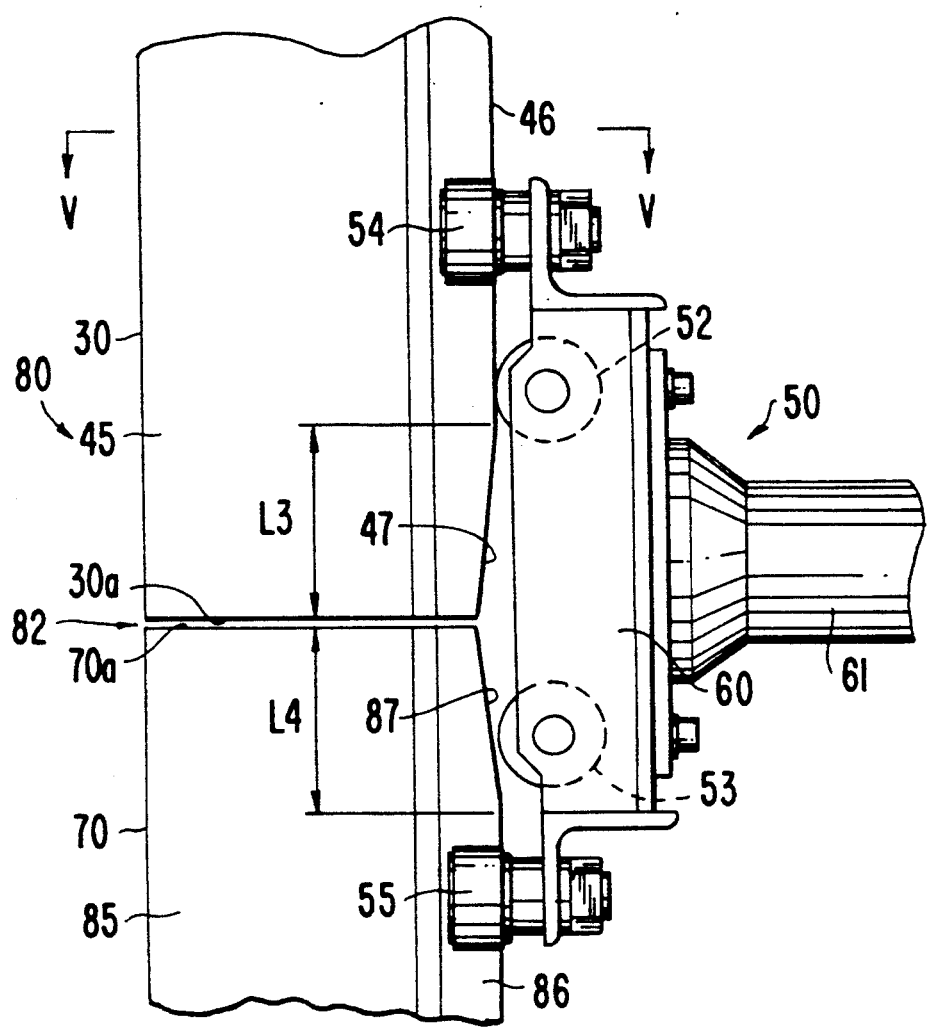
FIG. 4 is a schematic side view showing a roller unit used in the system shown in FIG. 1.
Figure 5:
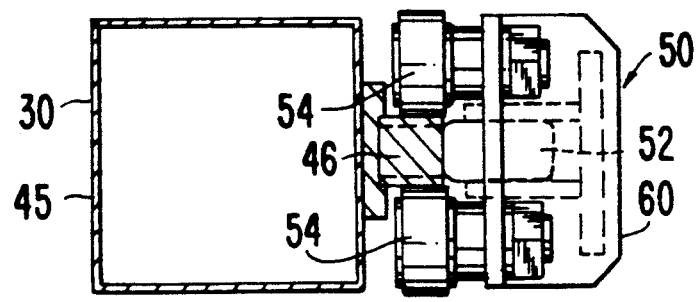
FIG. 5 i a schematic sectional view taken along line V—V in FIG. 4.
Figure 6:
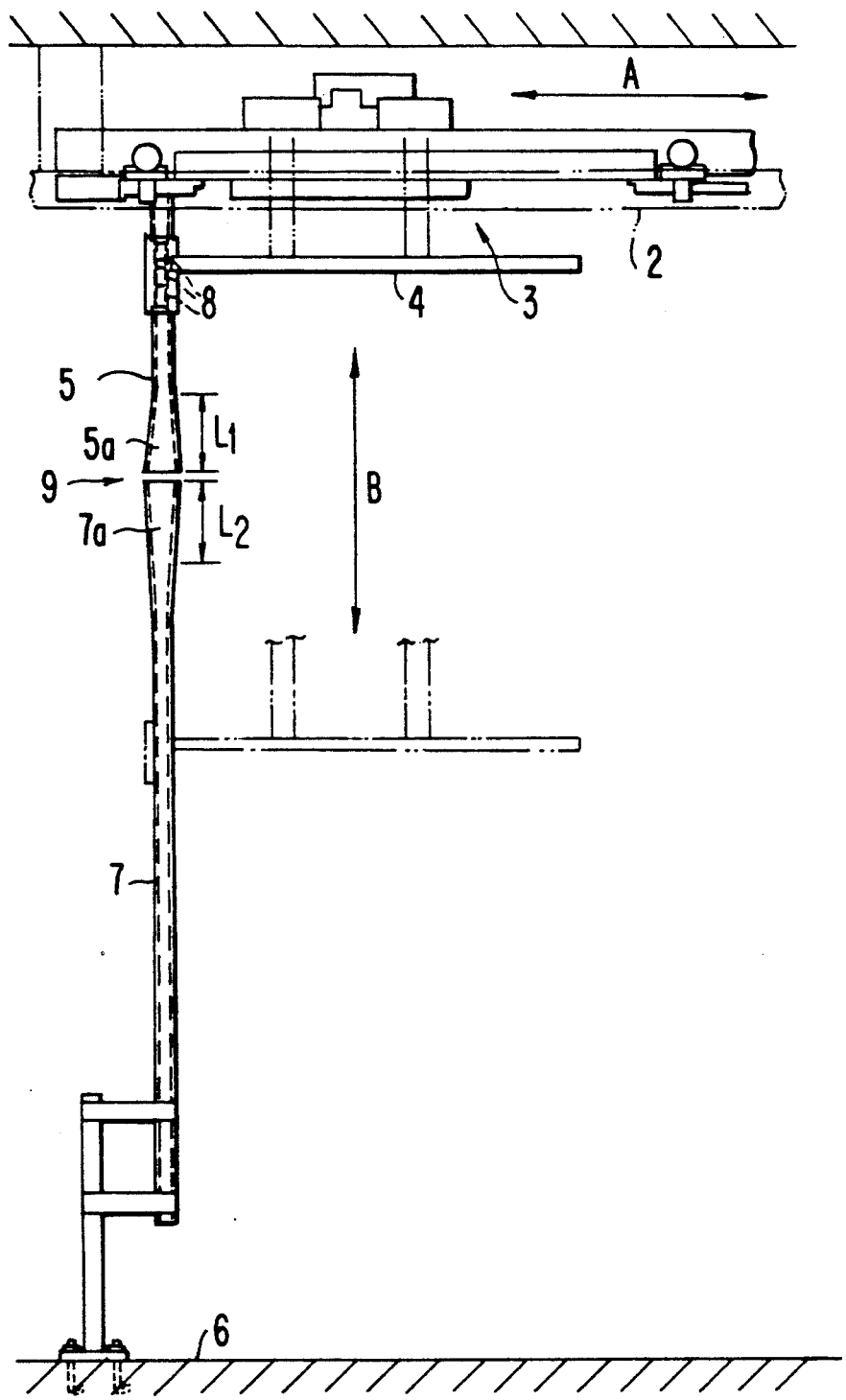
FIG. 6 is a schematic side view of a transportation system equipped with a prior art guide apparatus.

As shown in FIG. 4 and FIG. 5 showing the left upper rail portion 30, the upper rail portion 30 comprises a beam 45 having a rectangular cross section, and a rail 46 mounted along the beam 45. A tapered portion 47 of decreasing thickness and width, which gradually decreases toward the lower end of the beam 45, is disposed at the lower end of the rail 46 and extends over a length $L_3$. The right upper rail portion 31 is constructed in an identical manner to the rail portion 30.

Roller units 50 and 51 are movable vertically along the upper rail portions 30 and 31. As shown in FIG. 4 and FIG. 5 showing one roller unit 50 as representative, a pair of upper and lower guide rollers 52 and 53 are positioned in rolling contact with a front wall of the rail 46, and upper guide rollers 54 and lower guide rollers 55 are positioned in rolling contact with the side walls of the rail 46. Individual rollers 52 to 55 are mounted on a carriage 60 by means of roller bearings. The carriage 60 is mounted on a support member 61 extending in a horizontal direction.

Lower rail portions 70 and 71 are disposed beneath upper rail portions 30 and 31. As shown more clearly in FIG. 2, the lower rail portions 70 and 71 are fixed to the ceiling 13 through support arms 74 and 75, and the supporting structures 17.

The lower rail portions 70 and 71 extend vertically towards the floor 12, and are disposed at positions in which they are in line with the upper rail portions 30 and 31 when the traversal unit 20 stops at a predetermined workpiece transfer stage. Lower ends 76 and 77 of the lower rail portions 70 and 71 are supported to be adjustable in a horizontal direction relative the floor 12.

The upper rial portions 30 and 31 in combination with the lower rail portions 70 and 71, thus provide composite vertical guide rails 80 and 81.

As shown in FIG. 1, the height of the joints between the upper rial portions 30 and 31 and the lower rail portions 70 and 71 relative to the floor 12, differ between the left and right guide rails 80, 81. As shown in FIG. 2, heights $H_1$ and $H_2$ of the lower rail portions 70 and 71 differ from each other. Difference between $H_1$ and $H_2$ is preferably greater than the length $L_3$ of the tapered portion 47 of FIG. 4.

As shown in FIG. 4 and FIG. 5 showing one lower rail portion 70 as a representative, the lower rail portions 70 and 71 each comprise a beam 85 having a rectangular cross section. A rail 86 is mounted along the beam 85. A tapered portion 87 of decreasing thickness and width is located at the upper end of the rail 86 and extends over a length $L_4$. The tapered portions 47 and 87 disposed at the ends of the upper and lower rail portions 30 and 70, prevent the generation of shocks when the guide rollers 52 to 55 pass over the joint 82, or the joint 83.

In use, the body 26 holding the workpiece W is moved along the traversal guide rails 15 and 16, for example, from a predetermined workpiece loading station towards a workpiece transfers station. During this traversal movement, the body 26 is held at an elevated position.

After the traversal unit 20 has moved to a predetermined workpiece transfer station, the traversal movement is stopped. At this time, lower ends 30a and 30b of the upper rail portions 30 and 31 and top ends 70a and 71a of the lower portions 70 and 71 are vertically along with one another. The roller units 50 and 5 then move downwards in rolling contact from the upper rail portions 30 and 31 to the lower rail portions 70 and 71 and vertical movement of the body 26 is guided smoothly.

Furthermore, since the heights of the joint portions 82 and 83 of the left and right vertical guide rails 80 and 81 differ from each other, when the one roller unit 50 asses over one joint portions 82, the other roller unit 51 is in rolling contact with the vertical guide rail 81 at a position other than the joint portion 82 and its tapered portions 47 and 87. When the other roller unit 51 passes over the other joint portions 83, the roller unit 50 is then in rolling contact with the vertical guide rail 80 at a position other than the joint portion 82 and its tapered portions 47, 87.

In this manner, the body 26 is positively supported by the vertical guide rails 80 and 81 during its entire vertical movement stroke, thus reducing the generation of vibration or noise as the body 26 passes over the respective joint portions 82 and 82.

Furthermore, since the lower rail elements 70 and 71 are supported on the ceiling member 13, and the upper rail elements 30 and 31 are supported by the traversal unit 20 which also is supported on the ceiling member 13 if a positional deviation in the horizontal direction occurs in the building relative to the floor 12, no substantial deviations in the horizontal direction occur at the joint portions 82 and 83 between the upper rail portions 30 and 31 and the lower rail portions 70 and 71. This is also advantageous for the body 26 to achieve smooth vertical movement.

Moreover, in this embodiment, since tapered portions 47 and 87 are provided at ends of the rail portions 30, 31, 70, and 71 at the joint portions 82 and 83 of the vertical guide rails 80 and 81, shocks are eliminated when the body 26 passes over the joint portions 82 and 83, thereby achieving even smoother vertical movement of the body 26. Furthermore, since the upper guide roller 54 and the lower guide roller 55 are individually in rolling contact with the rails 46 and 86 of the vertical guide rails 80 and 81 so as to pinch the rail main bodies from both sides in the width direction, vibrations are suppressed even more effectively when the body 26 moves vertically, and, positional deviations of the workpiece are reduced.

With the present invention, vertical movement of the vertical moving body disposed on the traversal unit can be smoothly guided by the vertical guide rails, in a manner suppressing vibration and noise, and reducing positional deviations of the workpiece.

What is claimed is:

1. In a guide apparatus for a transportation system of the type including a horizontal traversal guide rail supported on a ceilling member of a building, a traversal unit movable along said traversal guide rail, and a pair of vertical guide rails for guiding vertical movement of a vertically moving body carried by said traversal unit;

said vertical guide rails each comprising an upper rail portion secured to said traversal unit and extending beneath said traversal unit, and a lower rail portion separated by a gap from said upper rail portion and having an upper end disposed beneath a lower end of said upper rail portion when said traversal unit is in a selected position of traverse, said lower rail portion continuing into said upper rail portion when said traversal unit stops at said selected position, the improvement comprising:

said respective lower rail portions each are supported from said ceiling member of said building; and a joint portion between said said upper rail portion and a said lower rail portion of one said guide rail being located at a height different from that of a corresponding joint portion of the other said guide rail, wherein said traversal unit passes over only a single said joint portion during any vertical movement.

2. The guide apparatus of claim 1, wherein lower ends of said upper rail portions and upper ends of said lower rail portions progressively decrease in width towards said joint portion.

3. The guide apparatus of claim 2, wherein the lower ends of said upper rail portions and the upper ends of said lower rail portions each are provided with surfaces inclined relative to the longitudinal axis of said rail portions.

4. The guide apparatus of claim 1, wherein lower ends of said upper rail portion and upper ends of said lower rail portion each include surfaces inclined relative to the longitudinal axis of said respective rail portions.

5. The guide apparatus of claim 1, in which each said lower rail portion is supported from said ceiling member by means of a support arm extending between said lower rail portion and said ceiling member.

6. The guide apparatus of claim 5, in which said supporting arm is attached to an upper portion of said lower rail portion.

* * * * *